United States Patent [19]

Ausprung

[11] Patent Number: 4,595,310
[45] Date of Patent: Jun. 17, 1986

[54] BALL-AND-SOCKET JOINT

[75] Inventor: Erich Ausprung, Geislingen, Fed. Rep. of Germany

[73] Assignee: Saxonia-Franke GmbH & Co., Göppingen, Fed. Rep. of Germany

[21] Appl. No.: 688,635

[22] Filed: Jan. 3, 1985

[30] Foreign Application Priority Data

Jan. 11, 1984 [DE] Fed. Rep. of Germany ....... 3400742

[51] Int. Cl.$^4$ .......................... F16C 11/00; F16D 1/12
[52] U.S. Cl. ......................................... 403/77; 403/141
[58] Field of Search .................. 403/77, 76, 141, 143, 403/122

[56] References Cited

U.S. PATENT DOCUMENTS 3,224,801 12/1965 Price-Stephens et al. .......... 403/122
4,225,261 9/1980 Marx .................................. 403/122
4,465,393 8/1984 Dieckmann ...................... 403/77 X

FOREIGN PATENT DOCUMENTS 198143 6/1958 Austria ................................ 403/141
721576 6/1942 Fed. Rep. of Germany ........ 403/77

Primary Examiner—Andrew V. Kundrat
Attorney, Agent, or Firm—Peter K. Kontler

[57] ABSTRACT

A ball-and-socket joint wherein the socket has a head with a spherical cavity and a one-piece or two-piece shank which extends radially from the spherical external surface of the head. The head is formed with a lateral opening whose diameter is normally less than the diameter of the cavity so that insertion of the ball into and its withdrawal from the cavity through the opening necessitates an enlargement of the opening. This is achieved by forming the external surface of the head with recesses which entail a reduction of the thickness of the corresponding portions of the head and enable the head to expand so that the ball can pass through the opening. That portion of the head which is disposed diametrically opposite the shank and is adjacent to the opening is not formed with recesses. If the shank is made of two sections, such sections can be assembled by snap action and they can confine the end portion of a motion transmitting or motion receiving member. The member is held against axial movement relative to the shank by projections which are provided on the two sections of the shank and extend into circumferentially extending grooves of the end portion.

23 Claims, 6 Drawing Figures

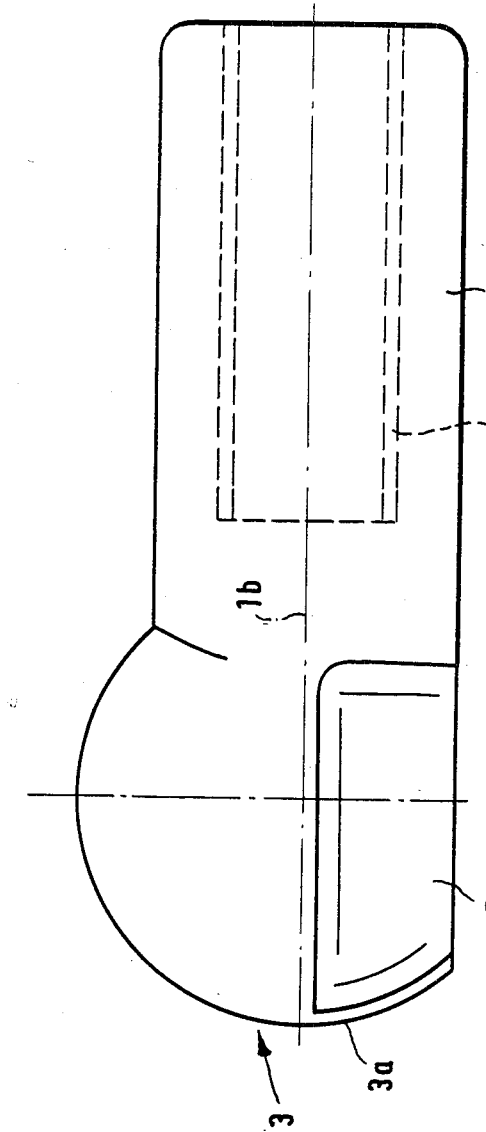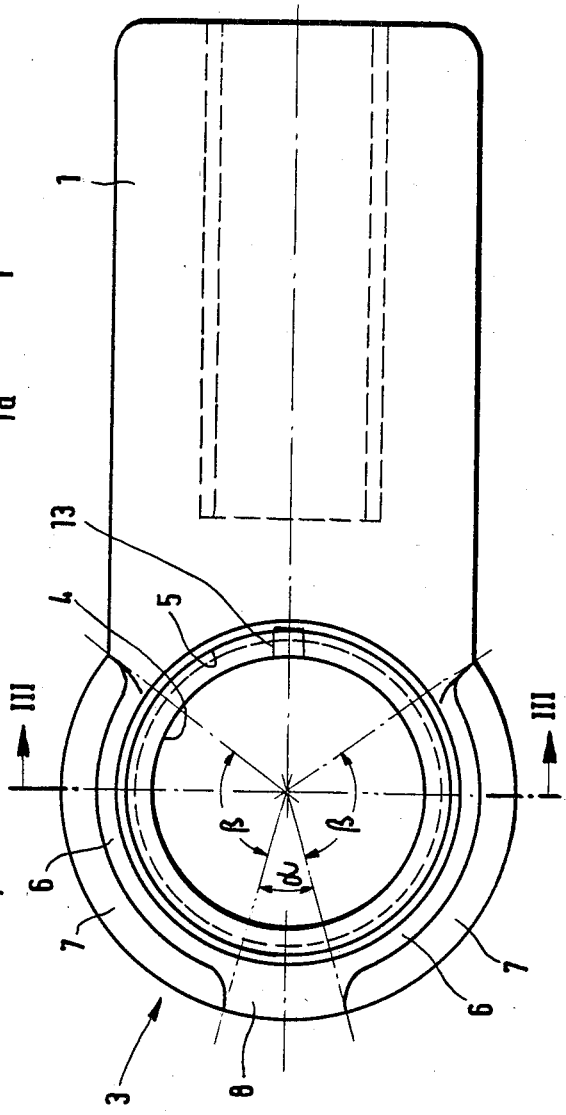

BALL-AND-SOCKET JOINT

BACKGROUND OF THE INVENTION

The present invention relates to improvements in ball-and-socket joints in general, and more particularly to improvements in the sockets of such joints. Still more particularly, the invention relates to improvements in the heads as well as to improvements in the shanks or stems of such joints.

It is already known to make the socket of a ball-and-socket joint of a single piece of plastic material. Reference may be had, for example, to German Offenlegungsschrift No. 31 19 061 which discloses a one-piece socket including a head defining a spherical cavity and a shank which can be connected to a motion transmitting or motion receiving part. The head is formed with a slot which divides it into two halves and such halves are movable relative to each other in order to provide room for insertion of a ball into or for its extraction from the spherical cavity. In other words, at least one of the halves must yield during insertion or withdrawal of the ball in order to provide sufficient room for introduction of the ball into or for its removal from the spherical cavity. The joint which is disclosed in the German Offenlegungsschrift further comprises a locking or closing device which is applied to the two halves of the head subsequent to introduction of the ball into its cavity in order to prevent accidental extraction of the head.

The making (e.g., extrusion or injection molding) of such plastic articles is a complex and expensive operation. Thus, the mold must be provided with a suitable insert which causes the formation of the aforementioned slot between the two halves of the head, and the removal of the insert upon completion of the injection molding or extruding operation is a time-consuming procedure which contributes significantly to the overall cost of the finished article. The cost of the mold is rather high, primarily due to the need for an insert which is to ensure the formation of a slot between the two halves of the head.

OBJECTS AND SUMMARY OF THE INVENTION

An object of the invention is to provide a novel and improved socket for use in ball-and-socket joints and to construct and assemble the socket in such a way that its versatility exceeds the versatility of conventional sockets.

Another object of the invention is to provide a socket which occupies less room and requires less material than heretofore known sockets even though its stability and rigidity at least match those of a conventional socket.

A further object of the invention is to provide a novel and improved head for a one-piece plastic socket which is used in a ball-and-socket joint.

An additional object of the invention is to provide a novel and improved shank which forms part of the above outlined socket.

A further object of the invention is to provide a novel and improved method of enhancing the versatility and reducing the bulk, weight and cost of a socket which is used in a ball-and-socket joint.

An additional object of the invention is to provide a socket whose head can reliably retain a ball without necessitating the use of locking or like devices while the ball is confined in its cavity.

Another object of the invention is to provide a novel and improved ball-and-socket joint which employs the above outlined socket.

A further object of the invention is to provide the socket with novel and improved means for properly locating a motion transmitting or motion receiving part with reference to the shank.

An additional object of the invention is to provide a novel and improved method of enhancing the elasticity of one or more selected portions of the head of the above outlined socket.

Another object of the invention is to provide a simple and inexpensive method of making plastic sockets in available machinery.

One feature of the invention resides in the provision of a socket which forms part of a ball-and-socket joint and comprises a head having a spherical cavity and a shank extending from the head and serving to receive the end portion of a rod-shaped or otherwise configurated motion transmitting or motion receiving member. The head has a preferably circular or substantially circular lateral opening which communicates with the cavity and serves to allow for insertion of a ball into or for withdrawal of a ball from the head. The maximum area of the opening is normally less than the maximum cross-sectional area of a ball which fits snugly into the cavity of the head, and the external surface of the head is provided with recesses which surround a portion of the opening so as to allow for some expansion of the head in the region of the opening for the purpose of inserting a ball into or of withdrawing a ball from the cavity. The thickness of the head, as measured radially of the cavity, preferably matches or closely approximates a predetermined thickness (which ensures adequate stability of the head) save in the regions of the recesses where the head can be elastically expanded to permit the ball to pass through the opening. That surface of the head which surrounds the opening preferably diverges in a direction away from the center of the spherical cavity of the head (such surface can resemble or constitute a frustoconical surface).

The recesses preferably include two recesses which are at least substantially mirror symmetrical to each other with reference to a plane halving the cavity and including the axis of the shank. A portion of the head is devoid of recesses and is disposed diametrically opposite the shank. Such portion of the head preferably extends along an arc of approximately 20 degrees, as considered in the circumferential direction of the surface bounding the opening.

The external surface of the head is preferably an at least substantially spherical surface with a segment-shaped part missing in the region of the lateral opening. The head is preferably provided with one or more channels which establish communication between the cavity and the surrounding atmosphere to allow for escape of air from the cavity during introduction of a ball into the head by way of the lateral opening.

The diameter of the opening is normally less than the diameter of the cavity, and such opening is preferably disposed in a plane which is parallel to the axis of the shank.

Another feature of the invention resides in the provision of a socket which can be used in ball-and-socket joints and comprises a head (e.g., a head of the aforedescribed type) having a spherical ball-receiving cavity, a shank which includes a first section rigid with the head and a second section which is separably connected to and defines with the first section an elongated hole (e.g., a blind hole), and an elongated motion transmitting or motion receiving member which is removably received in the hole. The member and at least one of the sections have means for holding the member against movement in the axial direction of the shank, and the member can be removed from the hole in response to separation of the second section from the first section.

The hole preferably comprises first and second portions which are provided in the respective sections of the shank, and the holding means preferably comprises mating male and female components provided on the elongated member and on each of the sections. The male components can be provided on the sections or on the elongated member. The latter preferably comprises a cylindrical portion which is received in the hole of the shank, and the female component can include one or more substantially circumferentially extending grooves provided in the peripheral surface of the cylindrical portion for projections which constitute the male component and are provided on one or both sections of the shank. The first section preferably consists of a material which is at least slightly elastic and parts of the projections on the first section are movable nearer to or further away from each other in response to deformation of the first section, particularly to permit insertion of the elongated member into or its withdrawal from the respective portion of the hole. The arrangement is or can be such that one-half of the cylindrical portion of the elongated member extends into that portion of the hole which is provided in the first section.

The improved socket preferably further comprises means for movably coupling the two sections of the shank to each other; such coupling means can comprise a flexible web which is integral with the two sections. In fact, the head, the two sections of the shank and the web can be made of a single piece of synthetic plastic material.

One of the sections is preferably provided with external protuberances which can extend in parallelism with the axis of the shank, and the other of the sections is then provided with internal protuberances engaging with the external protuberances when the second section is connected to the first section. Each section can comprise or constitute an elongated shell of semicylindrical shape with two parallel marginal portions. The marginal portions of one of the sections are provided with the aforementioned external protuberances, and the marginal portions of the other section are provided with the internal protuberances. The one section is preferably provided with depressions (e.g., in the form of channels or notches) which are adjacent to the external protuberances and receive the internal protuberances, and the other section can be provided with depressions for the external protuberances of the one section.

The peripheral surface of one of the sections (e.g., of the first section) can be provided with a circumferentially extending cutout whose length (as considered in the axial direction of the shank) matches or approximates the length of the other section, and at least a portion of such other section is then received in the cutout of the one section. The cutout need not be machined into the one section, i.e., it can be formed at the time of making the one section and may constitute an arcuate groove provided in the periphery of the one section.

The novel features which are considered as characteristic of the invention are set forth in particular in the appended claims. The improved socket itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 1 is a side elevational view of a socket which forms part of a ball-and-socket joint and embodies one form of the present invention;

FIG. 2 is a front elevational view of the socket as seen from the underside of FIG. 1;

DESCRIPTION OF THE PREFERRED EMBODIMENTS

Figure 3:
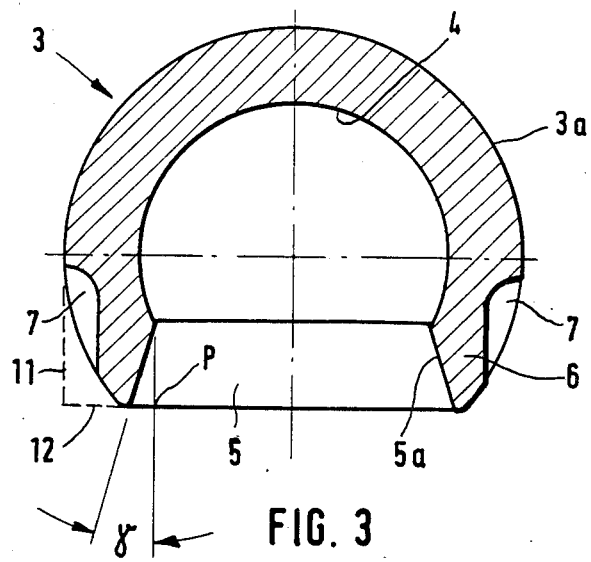
FIG. 3 is a sectional view of the socket as seen in the direction of arrows from the line III—III of FIG. 2.

Referring first to FIGS. 1 to 3, there is shown a socket which forms part of a ball-and-socket joint and includes a head 3 and a shank 1. The shank 1 has a tapped bore 1a which can receive the externally threaded end portion of a motion transmitting or motion receiving member (not shown), e.g., a pull rod or a hinge bar. The entire socket can be made from a single piece of synthetic thermoplastic material, e.g., by injection molding or any other suitable technique. The head 3 has a spherical external surface 3a and defines a spherical cavity 4 serving to snugly receive the ball (not shown) of the ball-and-socket joint. The ball can be inserted by way of a circular opening 5 which is bounded by frustoconical surface 5a diverging radially outwardly from the cavity 4. The opening 5 is disposed in a plane which is parallel to the axis 1b of the shank 1. The diameter of the opening 5 is smaller than the diameter of the spherical cavity 4, i.e., the opening 5 must be enlarged in order to allow for insertion of a ball into or for withdrawal of a ball from the interior of the head 3. To this end, the thickness of the head 3, as measured radially of the cavity 4, is reduced in the region of the opening 5 by providing the external surface 3a of the head with two arcuate recesses 7 which flank the plane including the axis 1b and halving the head 3. Such plane is normal to the plane of FIG. 2 and the recesses 7 are mirror symmetrical to each other with reference to the just discussed plane. This can be readily seen in FIG. 2. Each of the recesses 7 extends along an arc of approximately 110 degrees, as considered in the circumferential direction of the opening 5, and the recesses do not extend into a portion 8 of the head 3 which is disposed diametrically opposite the shank 1. The portion 8 extends along an arc alpha of between 10 and 35 degrees, preferably along an arc of approximately 20 degrees, as considered in the circumferential direction of the opening 5. This ensures that the head 3 can reliably retain a ball in the cavity 4. The depth of the recesses 7 is selected in such a way that they effect a reduction of the thickness of the head 3 to an extent which is necessary to allow for elastic deformation of the head 3 in the region of the opening 5 when the ball of the ball-and-socket joint is caused to pass through the opening 5, either on its way into or on its way out of the cavity 4. The angle gamma denotes in FIG. 3 the taper of the surface 5a which surrounds the opening 5; this angle can be a relatively small acute angle. The purpose of the outwardly tapering surface 5a is to facilitate the insertion of the ball into the cavity 4 as well as to allow for greater movability of the shank which is rigid or integral with the ball. Thus, and referring to FIG. 3, the shank for the ball would be arrested at the point P during pivotal movement in a clockwise direction if the surface 5a were replaced with a cylindrical surface having a diameter matching the smallest diameter of the opening 5.

The head 3 of the improved socket is formed with one or more channels or passages 13 which establish communication between the cavity 4 and the surrounding atmosphere and allow for escape of air during insertion of a ball into the head 3. Moreover, the channel or channels 13 allow for escape of surplus lubricant or grease from the cavity 4 in response to insertion of the ball or thereafter. The illustrated channel 13 is provided in that portion of the head 3 where the latter is integral with the shank 1 because this ensures that the socket is not unduly weakened as a result of the provision of such channel.

An important advantage of the improved socket is that its head is weakened (i.e., the thickness of the head is reduced below the prescribed thickness) only in the regions of the recesses 7, i.e., only in the areas where the head 3 must undergo deformation in order to allow for insertion of a ball into or for withdrawal of the ball from the cavity 4. The weakened portions of the head 3 (radially inwardly of the recesses 7) are denoted by the characters 6.

The broken lines 11 and 12 denote in FIG. 3 the outline of a conventional head which is devoid of recesses 7 and whose external surface is not spherical in the region immediately adjacent to the opening which allows for insertion or extraction of a ball. The utilization of a head which has a spherical external surface, also in the region of the opening, renders it possible to achieve substantial savings in material. Moreover, a spherical head can be turned with reference to the adjoining parts through a greater angle which enhances the versatility and hence the utility of the ball-and-socket joint utilizing the improved socket. In other words, the improved socket takes up less room than a conventional socket whose head has an outline identical with or resembling that indicated by the broken lines 11 and 12. The omission of material between the external surface 3a of the head 3 and the broken lines 11 and 12 contributes significantly to greater compactness, lower cost and greater versatility of the improved socket. Thus, the head 3 can be placed closer to the neighboring parts in a machine, apparatus or system which employs a ball-and-socket joint including the improved socket. This is important and highly desirable in many types of apparatus, machines, appliances or other devices which employ a ball-and-socket joint embodying the improved socket. The improved socket can be used in ball-and-socket joints which are installed in various types of circuits, transmissions and many other structures wherein the transmission of motion must or should take place by way of a ball-and-socket joint. The head of the improved socket can be larger than the head of a conventional socket to thus enhance the rigidity and stability of the joint, or the dimensions of the head can be reduced well below those of the head in a conventional socket without reducing the stability, safety and reliability of the ball-and-socket joint.

The improved socket can be formed in a plastic-processing machine which utilizes a simple two-piece mold. There is no need to provide a specially designed insert as in connection with the making of sockets of the type disclosed in the aforementioned German Offenlegungsschrift. Moreover, the mold which is used for the making of the improved socket need not have a complex and expensive core. Still further, the improved socket can be mass-produced with substantial savings in plastic material.

Figure 6:
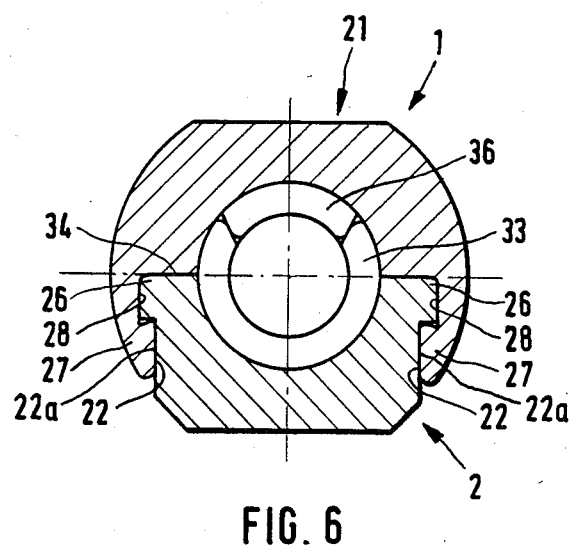
FIG. 6 is a transverse sectional view of the shank of the modified socket, with the second section attached to the first section.
Figure 5:
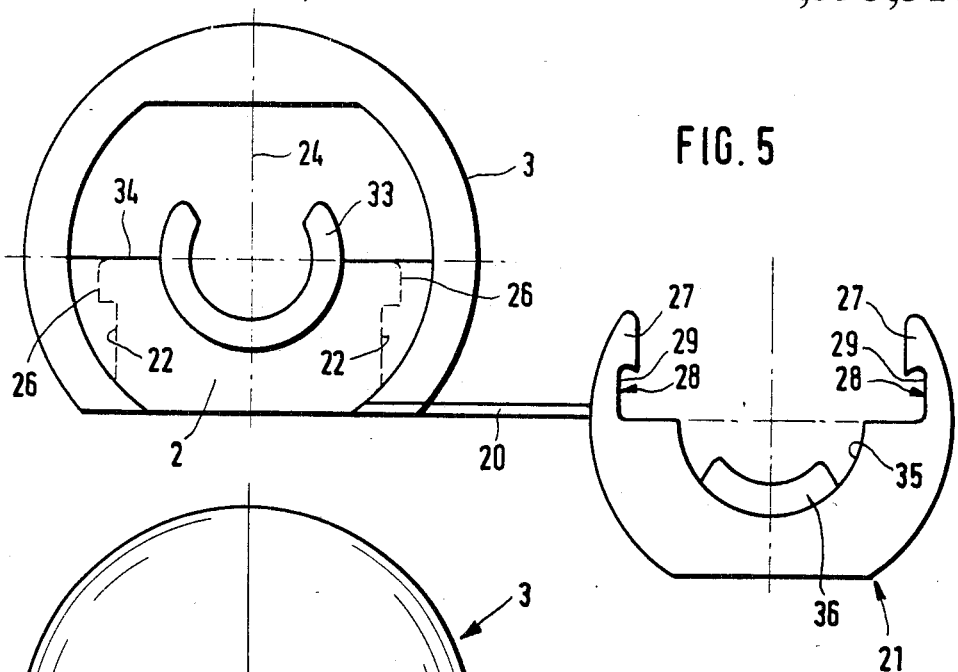
FIG. 5 is an end elevational view of the modified socket as seen in the direction of arrows from the line V—V of FIG. 4.
Figure 4:
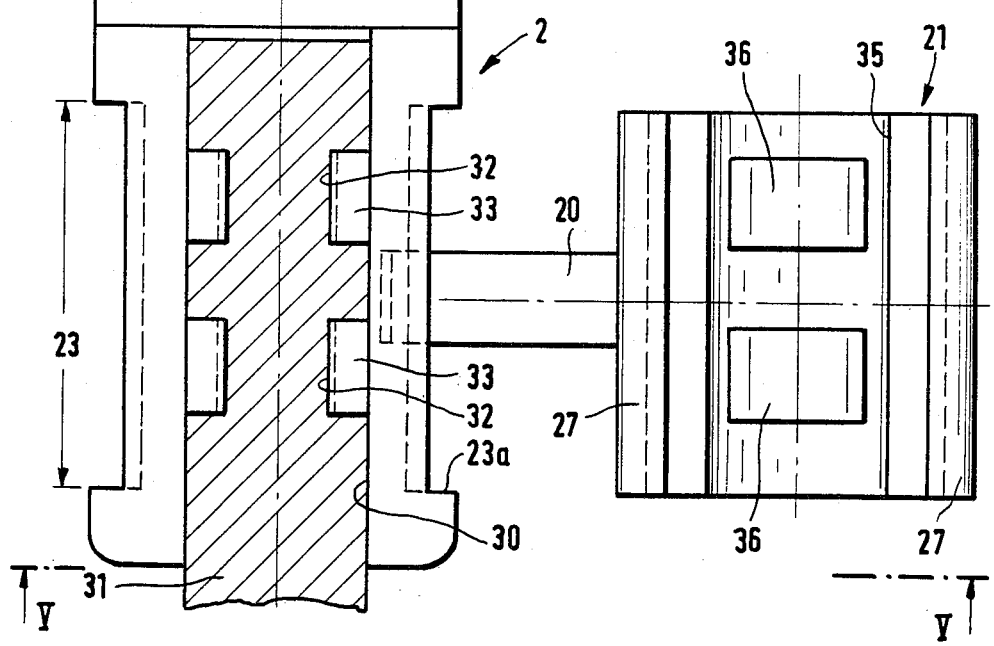
FIG. 4 is a side elevational view of a modified socket with the second section of the shank detached from the first section and with a motion transmitting or motion receiving rod inserted into the first section of the shank.

Referring now to FIGS. 4, 5 and 6, there is shown a modified socket which includes a head 3 (this head can be identical with that which is shown in FIGS. 1 to 3), a two-piece shank 1 including a first section 2 which is integral with the head 3 and a second section 21, and an elongated member 31 having a cylindrical end portion received in a blind hole 30 one-half of which is formed in the section 2 and the other half 35 of which is formed in the section 21. The means for coupling the sections 2 and 21 to each other comprises a flexible web 20. The entire socket including the head 3, the sections 2, 21 and the web 20 can be made of a single piece of synthetic thermoplastic material.

The section 2 resembles an elongated trough-shaped substantially semicylindrical shell with two marginal portions having external surfaces 22 provided with protuberances 26 which face away from each other and can be moved nearer to or further away from each other in response to deformation of the material of the section 2. The surfaces 22 are preferably parallel to a plane which includes the axis 25 of the shank 1 and the corresponding axis 24 of the head 3.

The section 21 preferably also resembles a substantially semicylindrical trough-shaped shell whose axially parallel marginal portions have confronting parallel internal surfaces 29 provided with protuberances 27 movable toward or away from each other in response to deformation of the material of the section 21. When the sections 2 and 21 are connected to each other in a manner as shown in FIG. 6, the protuberances 27 are received in the depressions 22a of the section 2 and the protuberances 26 are received in the depressions 28 of the surfaces 29 of the section 21 to ensure that the two sections cannot be accidentally separated from one another. The protuberances 27 must slide over the protuberances 26 when the sections 2 and 21 are being assembled with one another to surround the aforementioned end portion of the member 31 when the latter is received in the blind hole 30 of the socket 1.

In order to ensure that the section 21 cannot move axially of the section 2, the peripheral surface of the section 2 is formed with an arcuate cutout 23a whose length (shown at 23) matches or only slightly exceeds the length of the section 21 and which receives a portion of the section 21 when the latter is properly assembled with the section 2 in a manner as shown in FIG. 6.

The means for holding the cylindrical end portion of the elongated member 31 against axial movement relative to the shank 1 comprises two circumferentially extending grooves 32 which are provided in the peripheral surface of the cylindrical end portion and form part of the female component of the holding means. The male component of the holding means comprises projections 33 and 36 which are respectively provided in the concave internal surfaces of the sections 2 and 21 and extend into the adjacent grooves 32 when the cylindrical end portion of the member 31 is received in the hole 30 and the sections 2 and 21 are connected to each other in a manner as shown in FIG. 6. Each of the grooves 32 can extend all the way around the corresponding portion of the member 31. When the section 21 is separated from the section 2, the cylindrical end portion of the member 31 is inserted into that half of the hole 30 which is provided in the section 2 whereby the projections 33 of the section 2 extend into the respective grooves 32. The section 21 is thereupon attached to the section 2 in a manner as shown in FIG. 6 whereby the projections 36 of the section 21 enter the adjacent portions of the respective grooves 32 to complete the mating engagement of the projections 33, 36 of the male component of the holding means with the female component including the grooves 32 of the cylindrical end portion of the member 31.

As can be seen in FIG. 5, the tips of the arcuate projections 33 in the section 2 extend beyond the surface 34 at the protuberances 26 of the section 2 and such tips of the projections 33 must move apart in order to permit insertion of one-half of the cylindrical end portion of the member 31 into that half of the hole 30 which is provided in the section 2. In other words, each of the projections 33 extends along an arc which exceeds 180 degrees, as considered in the circumferential direction of the member 31. The aforementioned tips of the projections 33, which extend beyond the surface 34 of the section 2, are forcibly moved away from each other in response to insertion of the member 31 into the section 2, and the tips of the projections 33 then snap into the respective grooves 32 to thus ensure reliable retention of the member 31 in the section 2 even before the section 21 is secured to the section 2.

The marginal portions of the section 21 abut against the surface 34 of the section 2 when the two sections are assembled in a manner as shown in FIG. 6, and the projections 36 which extend from the concave surface surrounding the portion 35 of the hole 30 are then received in the adjacent portions of the respective grooves 32. Each of the projections 36 preferably extends along an arc (see FIG. 5), as considered in the circumferential direction of the shank 1, and each of the composite projections including a projection 33 and the respective projection 36 preferably extends along an arc of close to or exactly 360 degrees, i.e., each of the grooves 32 is or can be filled with the material of the sections 2 and 21 when the shank 1 is assembled and the sections 2, 21 hold the cylindrical end portion of the member 31 against movement in the direction of the axis 25.

An important advantage of the socket which is shown in FIGS. 4 to 6 is that the end portion of the elongated member 31 need not be provided with external threads and that the holding means including the grooves 32 and projections 33, 36 invariably ensures adequate retention of the member 31 in an optimum axial position with reference to the shank 1. Thus, it is possible to dispense with the formation of external threads on the end portion of the member 31 as well as with the formation of internal threads in the shank 1. Moreover, the insertion or removal of the end portion of the member 31 from the shank 1 takes up only a small fraction of the time which is necessary to screw an externally threaded elongated member into the tapped bore of a one-piece shank of the type known in conventional ball-and-socket joints. In fact, as soon as the end portion of the member 31 is properly installed in the hole 30, such end portion is automatically held in an optimum axial position with reference to the shank 1.

The insertion of the end portion of the member 31 into the hole 30 and attachment of the section 21 to the section 2 take up very little time. The same holds true for withdrawal of the end portion of the member 31 from the hole 30. Thus, the end portion of the member 31 can be inserted sideways into that portion of the hole 30 which is provided in the section 2 by the simple expedient of forcing the tips of the projections 33 slightly away from each other so that the member 31 can be held in the section 2 by snap action, and the protuberances 27 at the marginal portions of the section 21 are then forced apart during movement along the protuberances 26 so that they can snap into the recesses or depressions 22a adjacent to the external surfaces 22 of the section 2. This completes the assembly of the shank 1 and of the shank with the member 31. The member 31 can be separated from the section 2 as soon as the latter is separated from the section 21. Rapid removal of the end portion of the member 31 from the hole 30 is often desirable and necessary, e.g., in order to rapidly replace a damaged member 31 with a spare member. Moreover, once the member 31 is properly received in the hole 30, its axis automatically coincides with the axis 25 of the shank 1 so that the parts 1 and 31 need not be aligned with each other in a separate step.

It is clear that the positions of the grooves 32 and projections 33, 36 can be reversed, i.e., that the projections can be provided on the peripheral surface of the member 31 and the grooves can be provided in the concave internal surfaces of the sections 2 and 21. It is also possible to provide the member 31 with grooves as well as with one or more projections which are receivable in complementary grooves or in otherwise configurated recesses of the section 2 and/or 21. This ensures that the member 31 cannot be rotated in the hole 30 when the shank 1 is assembled around the end portion of the member 31.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A socket for a ball-and-socket joint, comprising a head having a spherical cavity, at least one channel connecting said cavity with the atmosphere and a shank extending from said head, said head further having a lateral opening communicating with said cavity to allow for insertion of a ball into or for withdrawal of a ball from said head, the mininum area of said opening being normally less than the maximum cross-sectional area of a ball which fits snugly into said cavity and said head having an external surface provided with recesses surrounding a portion of said opening so as to allow for expansion of said head in the region of said opening.

2. The socket of claim 1, wherein the thickness of said head, as considered radially of said cavity, matches a predetermined thickness except in the regions of said recesses.

3. The socket of claim 1, wherein said head has a second surface surrounding said opening and diverging in a direction away from the center of said spherical cavity.

4. The socket of claim 1, wherein said recesses include two recesses which are at least substantially mirror symmetrical to each other with reference to a plane including the axis of said shank, said head including a portion which is disposed diametrically opposite said shank and whose external surface is devoid of recesses.

5. The socket of claim 4, wherein said portion of said head extends along an arc of between 10 and 35 degrees, preferably along an arc of 20 degrees, as considered in the circumferential direction of said opening.

6. The socket of claim 1, wherein the external surface of said head is a substantially spherical surface with a segment-shaped part removed in the region of said opening.

7. The socket of claim 1, wherein said opening is at least substantially circular and its diameter is normally less than the diameter of said cavity.

8. The socket of claim 7, wherein said opening is disposed in a plane which is at least substantially parallel to the axis of said shank.

9. A socket for use in ball-and-socket joints, comprising a head defining a spherical ball-receiving cavity; a shank including a first section rigid with said head and a second section separably connected to and defining with said first section a hole, said hole including first and second portions which are provided in the respective sections of said shank, one of said sections having external protuberances and the other of said sections having internal protuberances which engage with said external protuberances when said second section is connected to said first section; and an elongated member removably received in said hole, said member and said sections having means for holding said member against movement in the axial direction of said shank, said holding means comprising mating male and female components provided on said member and each of said sections.

10. The socket of claim 9, wherein said female components are provided on said sections and said male components are provided on said member.

11. The socket of claim 9, wherein said female components are provided on said member and said male components are provided on said sections.

12. The socket of claim 9, wherein said member includes a cylindrical portion which is received in said hole, said female component including at least one substantially circumferentially extending groove provided in the periphery of said cylindrical portion and said male component including projections provided on said sections and extending into said groove.

13. The socket of claim 12, wherein said first section is at least slightly elastic and the projections of said first section have portions which are movable nearer to or further away from one another in response to elastic deformation of said first section.

14. The socket of claim 9, wherein one-half of said member extends into the portion of the hole in said first section.

15. The socket of claim 9 further comprising means for movably coupling said sections to each other.

16. The socket of claim 15 wherein said coupling means comprises a flexible web which is integral with said sections.

17. The socket of claim 15, wherein said head, said sections and said coupling means consist of a single piece of synthetic plastic material.

18. The socket of claim 9, wherein each of said sections includes an elongated shell having marginal portions, the marginal portions of said one section being provided with said external protuberances and the marginal portions of said other section being provided with said internal protuberances.

19. The socket of claim 9, wherein said one section has depressions adjacent to said external protuberances and receiving said internal protuberances, said other section having depressions adjacent to said internal protuberances and receiving the external protuberances of said one section.

20. The socket of claim 9, wherein one of said sections has a peripheral surface provided with a circumferentially extending cutout whose length matches or approximates the length of the other of said sections, at least a portion of said other section being removably received in said cutout.

21. The socket of claim 20, wherein said cutout is provided in said first section.

22. A socket for a ball-and-socket joint, comprising a head having a spherical cavity and a shank extending from said head, said head further having a lateral opening communicating with said cavity to allow for insertion of a ball into or for withdrawal of a ball from said head, the minimum area of said opening being normally less than the maximum cross-sectional area of a ball which fits snugly into said cavity and said head having an external surface provided with two recesses which are at least substantially mirror symmetrical to each other with reference to a plane including the axis of said shank, said recesses surrounding a portion of said opening so as to allow for expansion of said head in the region of said opening and said head including a portion which is disposed diametrically opposite said shank and whose external surface is devoid of recesses, said portion of said head extending along an arc of between 10 and 35 degrees, preferably along an arc of 20 degrees, as considered in the circumferential direction of said opening.

23. A socket for use in ball-and-socket joints, comprising a head defining a spherical ball-receiving cavity; a shank including an at least slightly elastic first section rigid with said head and a second section separably connected to and defining with said first section a hole, said hole including first and second portions which are provided in the respective sections of said shank; and an elongated member having a cylindrical portion removably received in said hole, said member and said sections having means for holding said member against movement in the axial direction of said shank, said holding means comprising mating male and female components provided on said member and each of said sections, said female component including at least one substantially circumferentially extending groove provided in the periphery of said cylindrical portion and said male component including projections provided on said sections and extending into said groove, the projections of said first section having portions which are movable nearer to and further away from each other in response to elastic deformation of said first section.

* * * * *